United States Patent
Vig et al.

(10) Patent No.: US 11,030,220 B2
(45) Date of Patent: Jun. 8, 2021

(54) GLOBAL TABLE MANAGEMENT OPERATIONS FOR MULTI-REGION REPLICATED TABLES

(71) Applicant: Amazon Technologies, Inc., Seattle, WA (US)

(72) Inventors: Akshat Vig, Seattle, WA (US); Somasundaram Perianayagam, Seattle, WA (US); Tony Petrossian, Bellevue, WA (US); Arijit Choudhury, Seattle, WA (US); James Christopher Sorenson, III, Seattle, WA (US); Alexander Richard Keyes, Seattle, WA (US); Akanksha Fouzdar, Sunnyvale, CA (US); Mark Roper, Bainbridge Island, WA (US); Oren Yossef, Bellevue, WA (US); Joon Ahn, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/570,891

(22) Filed: Sep. 13, 2019

(65) Prior Publication Data

US 2021/0081433 A1 Mar. 18, 2021

(51) Int. Cl.
  *G06F 16/27* (2019.01)
  *G06F 16/23* (2019.01)
  *G06F 16/22* (2019.01)

(52) U.S. Cl.
  CPC ........ *G06F 16/275* (2019.01); *G06F 16/2272* (2019.01); *G06F 16/2365* (2019.01)

(58) Field of Classification Search
  CPC . G06F 16/2272; G06F 16/275; G06F 16/2365
  See application file for complete search history.

(56) References Cited

U.S. PATENT DOCUMENTS 6,484,186 B1 * 11/2002 Rungta ............... G06F 11/1466
7,149,759 B2 12/2006 Morrison
(Continued)

OTHER PUBLICATIONS

International Search Report and Written Opinion from PCT/US/2020/050445, dated Nov. 30, 2020, pp. 1-11.

*Primary Examiner* — James Trujillo
*Assistant Examiner* — Michal Bogacki
(74) *Attorney, Agent, or Firm* — Robert C. Kowert; Kowert, Hood, Munyon, Rankin & Goetzel, P.C.

(57) ABSTRACT

Systems and methods are disclosed to implement, in a database system, global table management operations for global tables or objects that are replicated across multiple locations. In embodiments, for a regional replica of a global table, a requested change to a metadata property of the replica (e.g., an attribute data type, a write throughput limit, or a time-to-live setting) is propagated to other replicas of the global table at other locations. In embodiments, before performing the requested management operation, the database system may first verify that the operation can be successfully performed in all locations. In embodiments, the operation may be performed optimistically without verification, and rolled back if it cannot be performed everywhere. In embodiments, to serialize management operations on a global table, the database system may check for other pending management operations via a shared control object, and proceed when any pending operations are finished.

20 Claims, 9 Drawing Sheets

(56) References Cited

U.S. PATENT DOCUMENTS

| | | |
|---|---|---|
| 8,214,353 B2 | 7/2012 | Inturi et al. |
| 9,274,710 B1 * | 3/2016 | Oikarinen ............... G06F 3/067 |
| 9,396,242 B2 | 7/2016 | Varley et al. |
| 9,652,519 B2 | 5/2017 | Bourbonnais et al. |
| 2012/0284229 A1 * | 11/2012 | Kim ..................... G06F 16/275 707/634 |
| 2014/0279905 A1 * | 9/2014 | Muniswamy-Reddy .................... G06F 16/27 707/639 |
| 2015/0277802 A1 * | 10/2015 | Oikarinen ............ G06F 3/0604 711/114 |
| 2016/0267040 A1 * | 9/2016 | Barzik ................ G06F 13/4221 |
| 2017/0286516 A1 | 10/2017 | Horowitz et al. |

* cited by examiner

GLOBAL TABLE MANAGEMENT OPERATIONS FOR MULTI-REGION REPLICATED TABLES

BACKGROUND

Commoditization of computer hardware and software components has led to the rise of service providers that provide computation and storage capacity as a service. High throughput and availability demands have driven these services become more distributed on a geographical scale. Different approaches to the replication of data distributed geographically have resulted in significant challenges in complexity, availability, and performance.

In some database systems, a replication process may be implemented using replica objects in the multiple regions. The database system may manage these replica objects to maintain a consistent view of the data in the replica objects across all regions. When regional database objects are being used as replica objects in such a configuration, changes to metadata properties of one replica object may cause that replica to diverge from the other replicas over time. Techniques to consistently manage the metadata properties of these regional replica objects at a global level are needed to ensure the correctness of the replication process.

Figure 1:
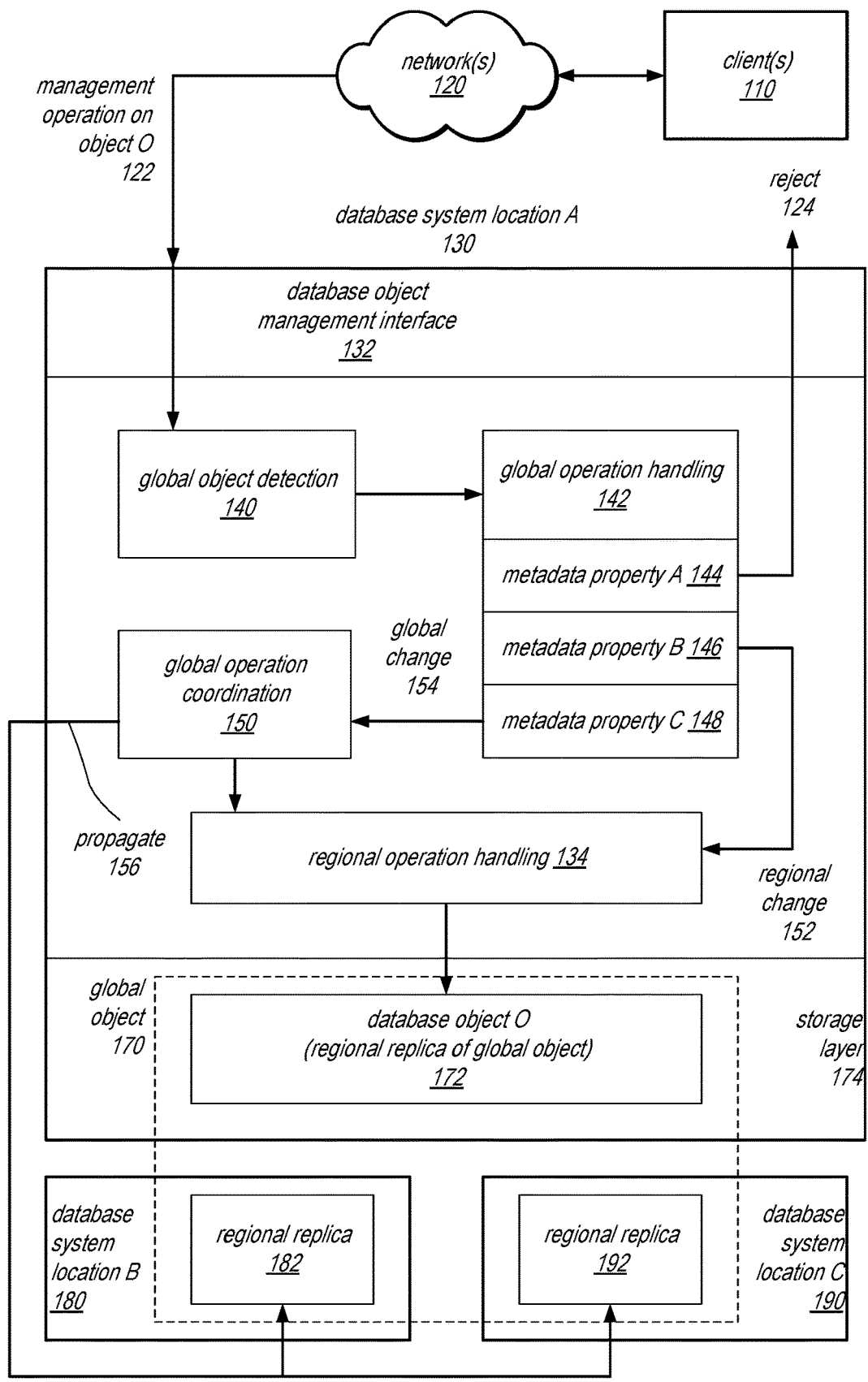
FIG. 1 is a block diagram illustrating an example database system that implements global object management operations to consistently manage the metadata properties of regional replica objects of a global object, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods described herein may be employed in various combinations and in embodiments to implement global object management operations in a database system to consistently manage the metadata properties of regional replicas of a global object that is replicated across multiple regions, according to some embodiments.

In some embodiments, a database system may allow users to create a global object (e.g. a global table) that includes a group of replica objects (e.g. replica tables) maintained at different geographic locations or regions. In some embodiments, these replica objects are hosted on distinct hardware (e.g. database servers) and/or software (e.g. database instances) at the different locations. In some embodiments, the replica objects may be used to support an ongoing replication process to replicate data among one other. For example, in some embodiments, replica objects may be configured to forward changes in one replica to other replicas of the global object, so that the global object can provide a consistent view of the replicated data in all regions, possibly subject to a small replication latency. In this manner, the global object allows database users in different regions to easily share a body of data that is readable and writable from any region.

In some embodiments, the database system may be implemented as a database service in a cloud-based service provider network, which hosts database instances on behalf of their clients using "in the cloud" hardware operated by the service provider. In some embodiments, the database service may provide publicly accessible interfaces to clients (e.g. via a public network such as the Internet), to allow the clients to both access the data in their hosted database instances, and manage the metadata properties of their database instances (e.g., the definition of database objects, configured characteristics and/or behavior of the database objects, etc.).

In some embodiments, when a database object is being used as a replica object that is part of a global object, changes to certain metadata properties of the replica object may cause that replica to diverge from the other replicas over time. In some embodiments, this divergence among the replicas may constitute incorrect behavior in the global object. In some embodiments, some metadata properties of replicas must be kept consistent (e.g. kept the same) to ensure correctness of the global object, while other metadata properties can be varied across the regions without causing any incorrect results in the replication process of the global object. For example, in some embodiments, metadata properties such as the attribute type definitions of regional replicas (e.g. the attributes of a materialized index defined on the global object) must be kept the same across all regions. As may be understood, if the regional versions of the indexes have differently defined attributes, changes in the global object may not be consistently projected to all regional indexes in the same manner, causing the data to diverge across the regions. As another example, a provisioned throughput limit (controlling how much write traffic can be accepted by a regional replica) or a time-to-live (TTL) setting (controlling how long a data item or record is maintained in a replica object) may need to be kept consistent across all regions. On the other hand, in some embodiments, some metadata properties, such as a read throughput limit on the replica object or a client-specific encryption key used on the replica object, can be allowed to vary from one region to another without affecting the correctness of the global object. In some embodiments, certain metadata properties of a replica object must be kept in an immutable setting to ensure correctness of the global object. For example, in some embodiments, a replica object must be configured to turn on its update stream, which may be used by the database system to propagate data changes in that replica to the other replicas.

In order to prevent users from improperly updating the metadata properties of regional replica objects, embodiments of database systems disclosed herein implements a global object management interface, which may to be used to automatically propagate changes in the metadata properties of one replica object to the other replica objects. In some embodiments, to reduce user confusion, the global object management operations may be implemented so that they can be invoked as management operations on regional objects (i.e. those objects that are not part of any global objects). In some embodiments, the database system may automatically detect that the target of a management operation is replica object, and upon such detection, automatically propagate the management operation to the other regions as needed.

In some embodiments, the propagated management operation may not be always be successfully performed in all regions, for example, due to one or more region-specific constraints. Accordingly, in some embodiments, the database system may implement different approaches to ensure that a multi-region management operation is performed in an all-or-nothing manner across all regions. In some embodiments, the management operation may be propagated via a two-phase commit process, where the operation is "committed" in all regions only after a "preparation" step to verify that the operation can be successfully performed in all regions. In some embodiments, the management operation may be attempted optimistically in all regions, and rolled back in all regions if it fails in any one region.

In some embodiments, the database system may implement a serialization protocol to serialize all global management operations on a global object, which may originate from different regions. As may be understood, in some embodiments, metadata property changes to the global object must occur in the same order across all regions to prevent data divergence. Accordingly, in some embodiments, a global management operation may check a shared control object for the global object (e.g. a global table or a global lock), before proceeding with the global management operation. In some embodiments, the shared control object may be used to enforce the sequencing of management operations on the global object.

Advantageously, embodiments of the database system and global object management interface disclosed herein may be used to enforce metadata correctness across replicas of a global object. Moreover, some of the disclosed global object management operations may be implemented as part of regional object management operations, so as to simplify the user interface of the database system and reduce user confusion. These and other features and benefits of the global object management interface are described in further detail below, in connection with the figures.

FIG. 1 is a block diagram illustrating an example database system that implements global object management operations to consistently manage the metadata properties of regional replica objects of a global object, according to some embodiments.

As shown, the figure depicts a database system that is implemented in multiple locations, including location A 130, location B 180, and location C 190. As may be understood, in different embodiments, the database system may be implemented across a large number of different locations. In some embodiments, each location may be a different geographical location of a distributed system. In some embodiments, each location may be a different data center located at a particular geographic zone within a distributed network of data centers. In some embodiments, each location may be a distinct sub-network (e.g. a local area network or LAN) that are connected to the other network locations, but whose network elements are not generally accessible outside of the network. In some embodiments, each location A, B, and C may each host a separate instance of the database system or service. In some embodiments, the database system may be accessed by clients 110 at each of locations A, B, or C, via one or more networks 120.

In some embodiments, the client(s) may encompass any type of client configurable to submit service requests to the database system, which may be implemented in a service provider network. In some embodiments, a client 110 may include a suitable version of a web browser or a plug-in module for a web browser, or other type of code module configured to execute as an extension to or within an execution environment to provide database or data storage service clients (e.g., client applications, users, and/or subscribers) access to the services provided by provider network. Alternatively, a client 110 may encompass an application such as a database application, media application, office application or any other application that may make use of persistent storage resources. In some embodiments, an application may include sufficient protocol support (e.g., for a suitable version of Hypertext Transfer Protocol (HTTP)) for generating and processing web services requests without necessarily implementing full browser support for all types of web-based data. A client 110 may be an application configured to interact directly with the services. In some embodiments, a client 110 may be configured to generate web service requests according to a REST-style web services architecture, a document- or message-based web services architecture, or another suitable web services architecture.

In some embodiments, the network 120 may be a public network such as the Internet. In some embodiments, the client(s) 110 may lease different amounts of computing resources for one or more services provided by the service provider network 230, such as a serverless execution service 240, as shown. In some embodiments, the service provider network 230 may operate a large number of computing stems that may be provisioned and de-provisioned on demand to support the operations of its services. The services may be implemented using one or more service endpoints configured to receive and process services requests. The services may be implemented using hardware and/or software to properly receive and process HTTP-based web services requests directed to their endpoints. In one embodiment, the services may be implemented as a server system configured to receive web services requests from clients and to forward them to various components that collectively implement a data storage system, serverless execution system, object storage system, etc., for processing. In other embodiments, the services may be configured as a number of distinct systems (e.g., in a cluster topology) implementing load balancing and other request management features configured to dynamically manage large-scale web services request processing loads.

In some embodiments, as shown, the database system may receive data access operations or data object management operations via a network 120. In various embodiments, the network 120 may encompass any suitable combination of networking hardware and protocols necessary to establish network communications between clients 110 and database system. For example, network 120 may encompass the various telecommunications networks and service providers that collectively implement the Internet. Network 120 may also include private networks such as local area networks (LANs) or wide area networks (WANs) as well as public or private wireless networks. For example, both a given client 110 and database may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and the database system. In some embodiments, clients 110 may communicate with network-based database using a private network rather than the public Internet. For example, a client 110 may be provisioned within the same enterprise as the database and/or the underlying system described herein. In some embodiments, a client 110 may comprise a service that is offered by the same service provider that offers the database as a service.

As shown, in the depicted embodiment, the client 110 is configured to issue management operations on database objects in the database system, such as management operation 122 directed to object O. In this example, database object O 172 (stored in the storage layer 174 of the database system 130 as shown) is a regional replica object that is part of a global object 170. As shown, global object 170 in this example is composed of three regional replica objects 172, 182, and 192, which are maintained at the three different locations A 130, B 180, and C 190. In some embodiments, the database system may implement a managed replication process among the replica objects 172, 182, and 192, in order to maintain a consistent view of the data across the replica objects. In some embodiments, the replication process may involve performing, at each location, sending data changes received at that location to the other locations, and receiving and applying data changes from the other locations to the local replica object. In some embodiments, the sending and receiving of data changes may be performed using an update stream that indicates a sequence of data changes that have been applied to an individual replica object. In some embodiments, each of the replica objects 172, 182, and 192 may be writable, so that the global object may be updated from any of the three locations 130, 180, and 190.

In some embodiments, as shown, the management operation 122 may be received via a database object management interface 132. In some embodiments, the management interface 132 may be provided by the database system to allow clients to specified a variety of management operations, which may include object management operations to modify various metadata properties of individual objects in the database (e.g. tables, indexes, etc.). In some embodiments, the management interface 132 may be implemented as a set of invocable function calls, which may be for example web service calls. In some embodiments, the management interface 132 may be implemented as a programmatic interface, for example, an application programming interface or API. In some embodiments, the management interface 132 may be implemented as a user interface, such as a command line interface (CLI) or a graphical user interface (GUI). In some embodiments, the management interface 132 may be implemented as a network protocol exposed by the database system.

In some embodiments, the management operation 122 may include a variety of different types of management operations. In some embodiments, the management operations may correspond to different types of invocable functions that to allow users of the database system to view and/or modify metadata information about database objects in the database system. For example, in some embodiments, management operations may include operations to create, modify, or delete a database object (e.g. a table or an index for a table), modify various attribute data types of a database object, and modify various metadata properties of a database object (such as the read/write throughput limit, different encryption or decryption keys used with the object, or time-to-live values for data items in the object, whether an update stream is to be enabled for the object, etc.). In some embodiments, some of the management operations may be used for both global objects and regional objects (e.g., those that are not part of a global object). For example, in some embodiments, the database system may overload certain regional object management operations to perform certain additional or alternative actions for global objects. In some embodiments, certain management operations may be defined specifically for global objects. For example, in some embodiments, such operations may allow the user to create a global object, sever the regional replicas of a global object, add a regional replica for a global object, or detach or remove a regional replica from a global object. As shown, all of these different types of management operations may be sent to the database system via the management interface 132, and programmatically handled by the database system (e.g. a local instance of the database system 130, 180, or 190).

As shown, in some embodiments, the database system may implement a global object detection module 140. In some embodiments, as discussed, one type of management operation may be invoked for both a regional object and a replica of a global object. However, the actual execution of the operation may be different depending on whether the target database object is regional object or part of a global object. For example, in some embodiments, a change of a metadata property of a database object may be performed differently, depending on whether the object is regional or global. Accordingly, in some embodiments, the global object detection module 140 may be used to determine whether the target database object to be modified (here object O 172) is part of a global object. In some embodiments, the detection may be performed by examining the underlying metadata definition of the target database object.

As shown, in some embodiments, if it is determined that the target object is part of a global object, the database system may invoke a global operation routine or module 142. In some embodiments, not shown in the figure, if the target object is not part of a global object, the database system may bypass the global operation handling routine and instead invoke a regional operation handling routine or module 134. In this manner, the database system may overload certain management operations to operate on both regional and global objects, so as to present a simpler management interface to the user, with fewer types of management operations.

As shown, in some embodiments, the global operation handling 142 may determine how the management operation 122 is to be performed, based on a type of metadata property that is being changed in the operation. In this example, three different types of metadata properties and shown, property A 144, property B 146, and property C 148. In some embodiments, the global operation handling routine 142 may include more or few categories of metadata properties.

In this example, metadata property A 144 is a type of metadata property that is to be kept immutable for replica objects in a global object. In some embodiments, such a property may include the enabling or disabling of an update stream from the object, which is used by the database system to send changes from one replica to the others. When a replica object is part of a global object, in some embodiments, its update stream should not generally be turned off. As another example, another type of immutable metadata property may specify a global permission is to be granted on all regional replica objects, to allow the database system to perform certain ongoing management on the regional replicas. According, as shown, if the management operation 122 attempts to change this immutable property for global objects, the operation 122 will be simply rejected 124. In some embodiments, the rejection 124 may be provided via a response to the operation 122, and may indicate the reason for the rejection (e.g. that the operation is attempting to illegally modify an immutable property for the global object).

In this example, metadata property B 146 is a type of property that can be varied among different replica objects of a single global object 170. In some embodiments, such a property may include the read throughput limit of a replica object. In some embodiments, the amount of read traffic that can be handled by a regional replica can be different across regions, because this property does not impact the actual data stored in the replica objects. As another example, an encryption or decryption key that is associated with the regional replica may be another property that can be different from region to region. For example, in some embodiments, each region's owner may specify a region-specific encryption to be implemented on its replica. As another example, another type of metadata property that can be allowed to vary across replica objects may be a billing mode attribute, which may be used to control how a customer is charged for read and write throughput used by the customer on the replica object. In some embodiments, the billing mode setting may allow customers to pre-provision some level of throughput for the object, or be billed on a per-request basis. Accordingly, as shown, if the management operation 122 is attempting to change this type of metadata property 146, the database system may simply forward the operation to the regional operation handler 134, which performs the operation regionally as a regional change 152.

In this example, metadata property C 148 is a type of property that is to be kept consistent across all regional replicas of the global object 170. In some embodiments, such a property may include the attribute data types on the replica object (e.g., the precision of a numeric field, whether the attribute is designated as part of a primary key or partition key set, or a sort key set, etc.). In some embodiments, such a property may be an attribute data type on a global index object that is dependent on a global table. In some embodiments, index object may be defined as part of a global table definition, so that a copy of the index object will be replicated in the different regions. In some embodiments, the index object may be a materialized object that copies (or projects) a view of the data from the base table. In some embodiments, because the index object is also to be replicated in the multiple regions, its attribute types, projection logic, and other metadata properties, may also need to be kept consistent across the regions. Otherwise, the data in the index objects may diverge within the regions. As another example, another type of metadata property that should be kept the same across all regions is a write throughput limit of a replica object. In some embodiments, if this limit is set different from region to region, one burst of writes in one region may succeed, while the same burst in another region may fail (by exceeding the write throughput limit). To avoid such situations, in some embodiments, the database system may prevent the write throughput limit from varying across the different regions. As one more example, another type of metadata property that should be kept the same across the regions is a time-to-live (TTL) setting of the replica object. In some embodiments, the TTL setting or value may dictate how long data items are to be kept in a database object before it is deleted. In some embodiments, the TTL feature may allow a database object to maintain only a small window of recent data, so to keep the size of the database object small and to improve querying performance. In some embodiments, because different TTL values will cause the replica objects to have different contents, the database system may prevent the values from varying across the different regions.

Accordingly, as shown, if the management operation 122 is attempting to change this type of metadata property 148, the database system may not only forward the operation to the regional operation handler 134, but also propagate 156 the operation as a global change 154 to the other regional replicas of the global object 170. In this manner, the database system will automatically perform management operation on all replica objects of the global object 170 in a transparent fashion, when it is needed. In some embodiments, the propagation of the operation may be performed via a global operation coordination module 150, which may implement the actual propagation process to ensure that the propagation is carried out correctly. In some embodiments, the propagation 156 may involve transmitting the operation 122 over one or more intermediate networks to database instances at the other locations (e.g. locations 180 and 190), so that they can be performed on the replica objects (e.g. objects 182 and 192) in those remote locations. In some embodiments, the propagation process may implement a protocol wait for acknowledgments from the remote replica locations, before the operation is acknowledged locally at the originating location. It should be noted that in some embodiments, the logic and components shown for location A 130 are repeated in all locations of the global object 170. Thus, management operations 122 and metadata property change requests may originate from any region of the global object 170. However, by using the global operation handling module 142 and the global operation coordination module 150, certain metadata properties of the replica objects (e.g. metadata property C 148) will always kept consistent for all regions.

Figure 2:
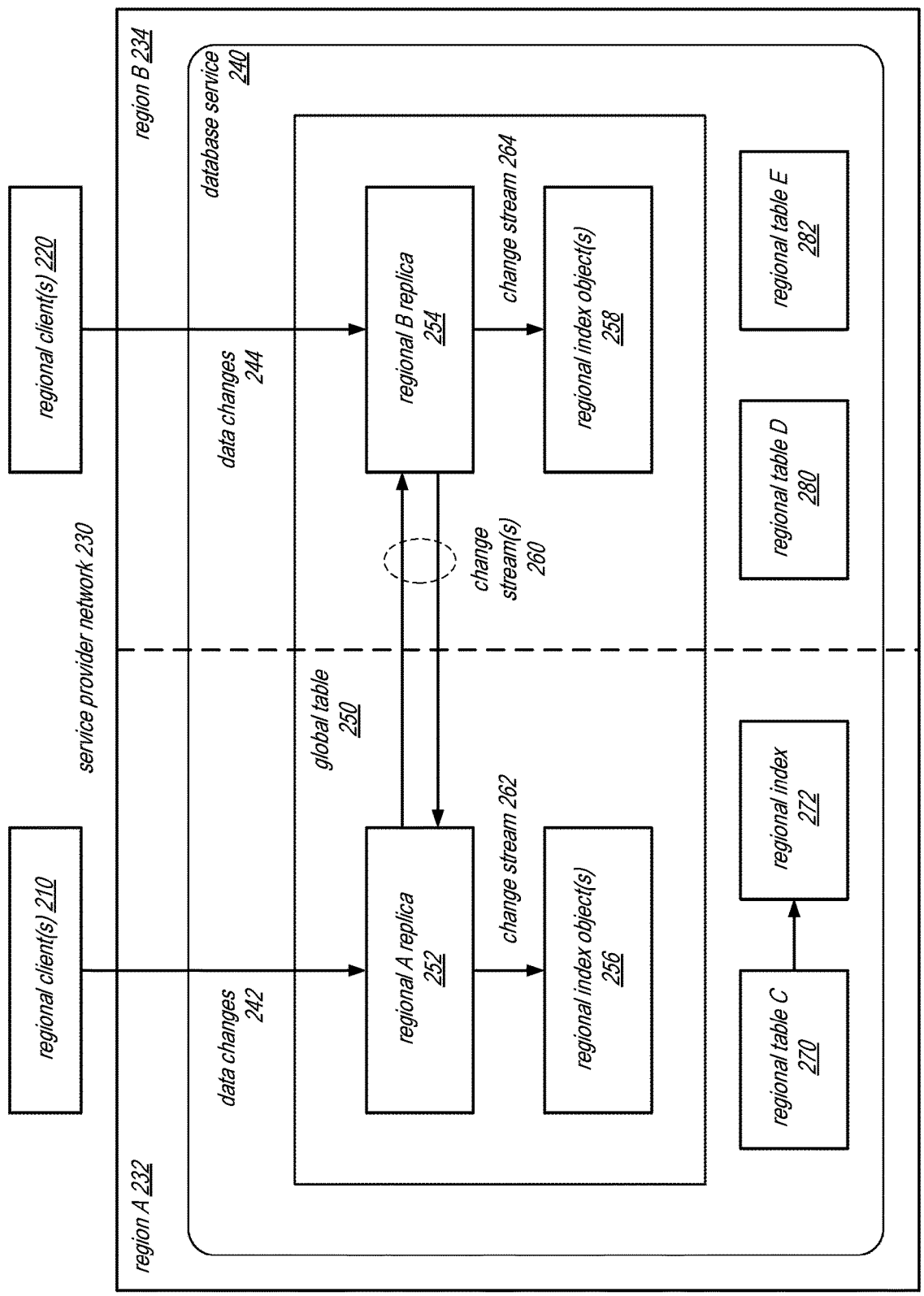
FIG. 2 is a block diagram illustrating an example database service that implements a global table with regional replicas and regional index objects, according to some embodiments.

FIG. 2 is a block diagram illustrating an example database service that implements a global table with regional replicas and regional index objects, according to some embodiments. As shown, the figure depicts a cloud-based service provider network 230, which may be used to provide services to one or more region clients 210 and 220. As shown, in some embodiments, components of the database system discussed in connection with FIG. 1 may be implemented as a database service 240 in the service provider network 230.

As shown, in some embodiments, the service provider network 230 may be divided into regions or zones, such as region A 232 and region B 234. In some embodiments, the regions may represent different sub-networks within the service provider network, different regional data centers, or different availability zones that include distinct groups of redundant computing resources to maintain high service availability.

As shown, in some embodiments, the database service 240 may be implemented by groups of computing nodes, which may be virtual machine (VM) instances hosted on physical hosts operated by the service provider. In some embodiments, the provisioning of these nodes or VM instances may rely on another underlying service of the service provider network that provides on-demand computing node instances. In some embodiments, the size of the pool of nodes dedicated to the database service 240 may be automatically scaled or adjusted based on service demand. In some embodiments, failing nodes or instances may be automatically removed from the pool and replaced with new instances or nodes.

As shown, in this example, a global table 250 is implemented over regions A 232 and B 234. In some embodiments, the global table 250 may be an example of the global object 170 of FIG. 1, and the regional replicas A 252 and B 254 may be examples of the replica object 172 of FIG. 1. As shown, in this example, the two replica objects 252 and 254 may receive respect data changes 242 and 244 from respective regional clients 210 and 220. These data change may be received, for example, via data access requests to the database service 240 at the two regions. The data access requests may include requests to insert, update, or delete data items from the replica objects 252 and 254.

In some embodiments, the database service (e.g. the two instances of the database service running at the two regions 232 and 234) may implement a replication process or protocol, to synchronize the contents of the two regional replicas 252 and 254. In some embodiments, the replication protocol may use respective change streams 260 generated from the two replica objects. In some embodiments, the database system may provide a feature to generate this change stream for any database object, to provide all changes or change requests to the object in sequential and/or streamed form. In some embodiments, the format of records in the change stream may be configurable, for example, to include the state of changed records before the change, after the change, or both. In some embodiments, different types of interested listeners may register to receive the change stream of a database object, and take action based on the contents of the change stream.

As shown, in this example, the replica tables 252 and 254 may both belong to a replicated table group for the global table 250. In some embodiments, the replication process is performed via the change streams 260. In some embodiments, the receiving side of a change stream 260 may apply the changes in the change stream to its local replica table. In some embodiments, the database system in the two regions 232 and 234 may implement a phased commit process to correctly handle conflicting updates between the two tables 252 and 254. Although only two locations and two tables are shown in the figure, in some embodiments, the global table 250 and the replication process may be implemented over any number of regions and tables ensuring eventual consistency across all replicas of the global table 250.

As shown, in this example, both tables 252 and 254 are associated with a respective regional index object 256 and 258, respectively. In some embodiments, these index objects 256 and 258 may be defined as part of the table 252 or 254, or as part of the global object 250. In some embodiments, the index objects 256 and 258 may include a copy of some data (or transformed data) from their base tables 252 and 254. In some embodiments, the index objects 256 and 258 may be populated based on the change streams 262 and 264, as shown. Thus, any changes to the base table may be immediately reflected in their associated indexes. In some embodiments, the change streams 262 and 264 may be the same change streams 260 that are used to replicate the tables 252 and 254 across the two regions. In some embodiments, the indexes 256 and 258 may store the data in a different partitioning scheme (e.g. using a different partition key attribute) or in a different sort order (e.g. using a different sort key attribute), in order to facilitate different types of querying. In some embodiments, multiple index objects may be defined for an individual base table. In some embodiments, the metadata properties of the table 252 and 254 may also exist separately for the index objects 256 and 258, such as for example, distinct write throughput limits, distinct TTL values, etc. As may be understood, because the contents of these index objects are also part of the global table 250, their metadata properties are also controlled by the database system, so that certain changes to their metadata properties are either forbidden or propagated to other regions of the global table.

As shown, in some embodiments, the database service 240 may generally maintain database objects (e.g. different tables or indexes) that are not part of any global objects. In some embodiments, a given data store or hosted database instance may include some objects that are part of a global object (e.g. replicated to one or more remote regions), and some objects that are only regional (e.g. not replicated to any remote regions). In this example, tables C 270 and index 272 are regional objects in region A 232, and tables D 280 and E 282 are regional objects in region B 234. In some embodiments, the database object management interface 132 may allow management operations on both global and regional objects. In some embodiments, as discussed, a single type of management operation may be overloaded to execute on both global and regional objects.

Figure 3:
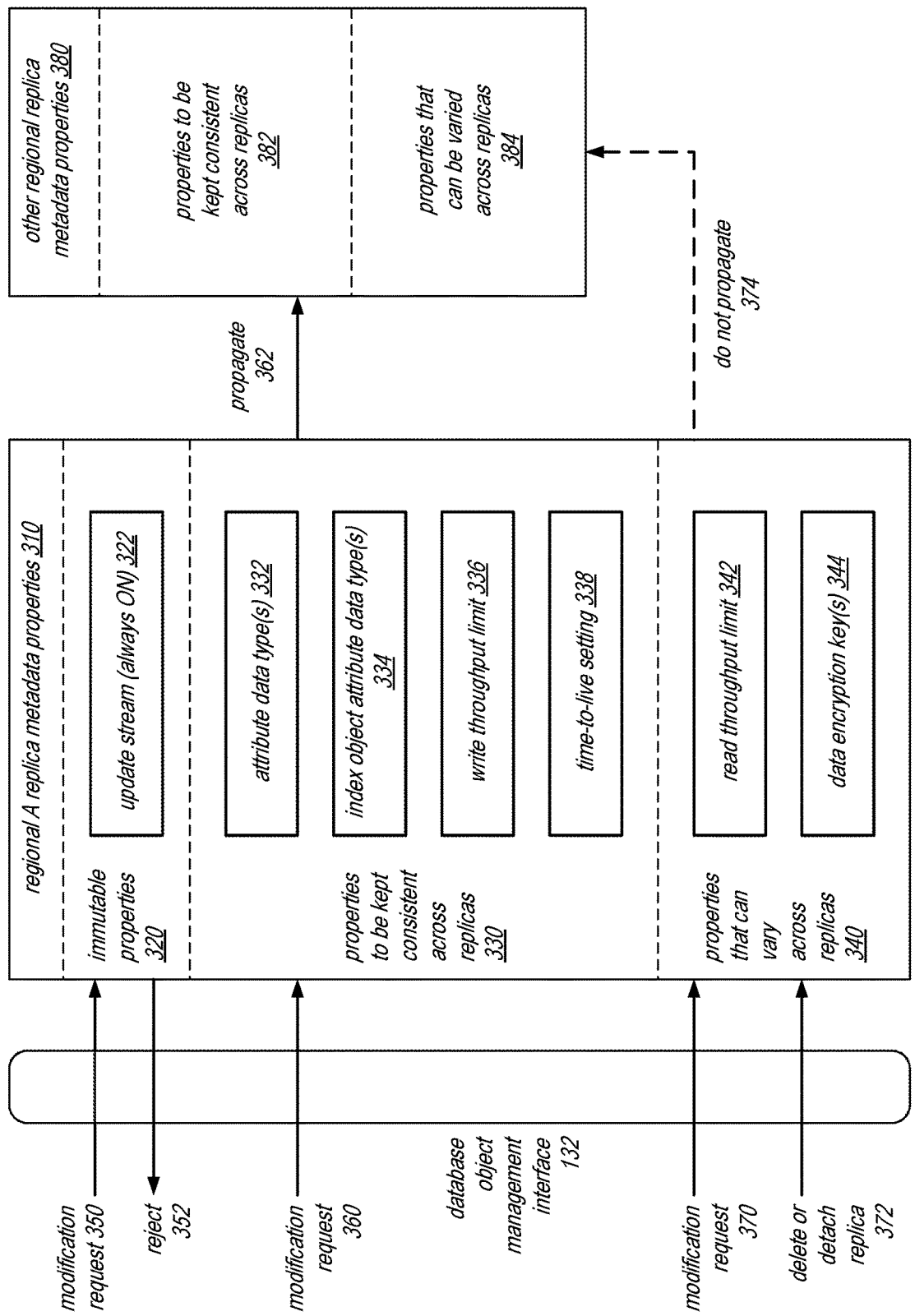
FIG. 3 illustrates example metadata properties of a regional replica object that can be configured via a database object management interface of a database system, according to some embodiments.

FIG. 3 illustrates example metadata properties of a regional replica object that can be configured via a database object management interface of a database system, according to some embodiments. As shown, the figure depicts a number of requests for database object management operations that may be received through the database object management interface 132 of FIG. 1. As shown, these requested database object management operations all involve changes to one or more metadata properties 310 of a regional replica object at region A.

As shown, modification request 350 requests to change an immutable property 320 on the replica object. As discussed, in some embodiments, certain metadata properties may be designated as immutable for replicas of a global object, such as for example metadata property A 144 of FIG. 1. As shown, in this example, an update stream property 322 of the replica belongs in this category. In this example, the update stream property of the replica object must always be turned on. Accordingly, the modification request 350 to change this property will result in a rejection 352 of the request.

As shown, modification request 360 requests to change one or more properties 330 of the replica object. As discussed, in some embodiments, certain metadata properties of the replica object may be designated to belong to a category 330 of properties that are to be kept consistent across all replicas of a global object, such as for example metadata property C 148 of FIG. 1. As shown, in this example, the attribute data types 332 of the replica object belong to this category. Additionally, the attribute data types 334 of index objects that depend on the replica object also belong to this category. As may be understood, if the attribute data types of these objects are permitted to differ in the different regions, the global object cannot correctly replicate data across the replica objects. As shown, another metadata property in this category is the write throughput limit 336 of the replica object. As may be understood, if writes to different regional replicas cannot all take place due to different values of this limit 336, the state of the global object will vary in the different regions. In some embodiments, depending on the ability of the database system to recover from excessive write request, some data differences across the regions may be permanent (e.g. where excessive write requests are immediately throttled). As shown, another metadata property that falls in this category 330 is the time-to-live setting 338. As may be understood, if items in different replica objects of a global object are allowed to expire (e.g. deleted) at different times, the contents of the replicas will diverge over time. Accordingly, modification request 360 for any of these metadata properties will be performed locally on the region A replica, but also propagated 362 to other regional replicas 380 that are part of the same global object. At the remote regions, the requested operation 360 will be performed on the metadata properties 382 of those remote replica objects, so that those metadata properties will be kept consistent across all regions.

As shown, modification request 370 requests to change one or more properties 340 of the replica object. As discussed, in some embodiments, certain metadata properties of the replica object may be designated to belong to a category 340 of properties that can be different across the replicas of a global object, such as for example metadata property B 146 of FIG. 1. As shown, in this example, the read throughput limit 342 of the replica object belong to this category. As may be understood, the clients' ability to read the different regional replicas do not alter the contents of the regional replicas. Accordingly, this metadata parameter of the replica object does not impact the correctness of the replication process, and can be permitted to vary from one region to another. As shown, another metadata property in this category is the data encryption key(s) 344 that are used to encrypt or decrypted data in the regional replica. As may be understood, while this property affects how the data is stored in the replica, it does not alter the underlying data that is to be synchronized among the regions. Accordingly, this metadata property can also be different across the regions. However, in some embodiments, certain other keys may need to kept the same across the regions, where the keys are provided from a shared key management service. In some embodiments, the database service may rely on a cross-region key management service to furnish a common key used to encrypt its objects. In this case, in some embodiments, one or more metadata properties that refer to the common key in the key management service may need to be kept the same across the regions, so that these properties will belong to category 330, to be automatically propagated to the other replicas of the global object. If the metadata property to be changed falls in category 340, the modification request 360 will be performed only locally on the region A replica, and not propagated 374 to other replicas of the global object to update corresponding metadata properties 384 of those replicas.

As shown, the database object management interface 132 may also accept a request 372 to delete or detach a replica from the global object. In some embodiments, this request 372 may be categorized in category 340, so that any metadata properties changed (or deleted) by the request is not propagated to 374. This is because the request to delete or detach a replica is generally intended to be a local request, and not generally meant to delete or detach all replicas in all regions.

Figure 4A:
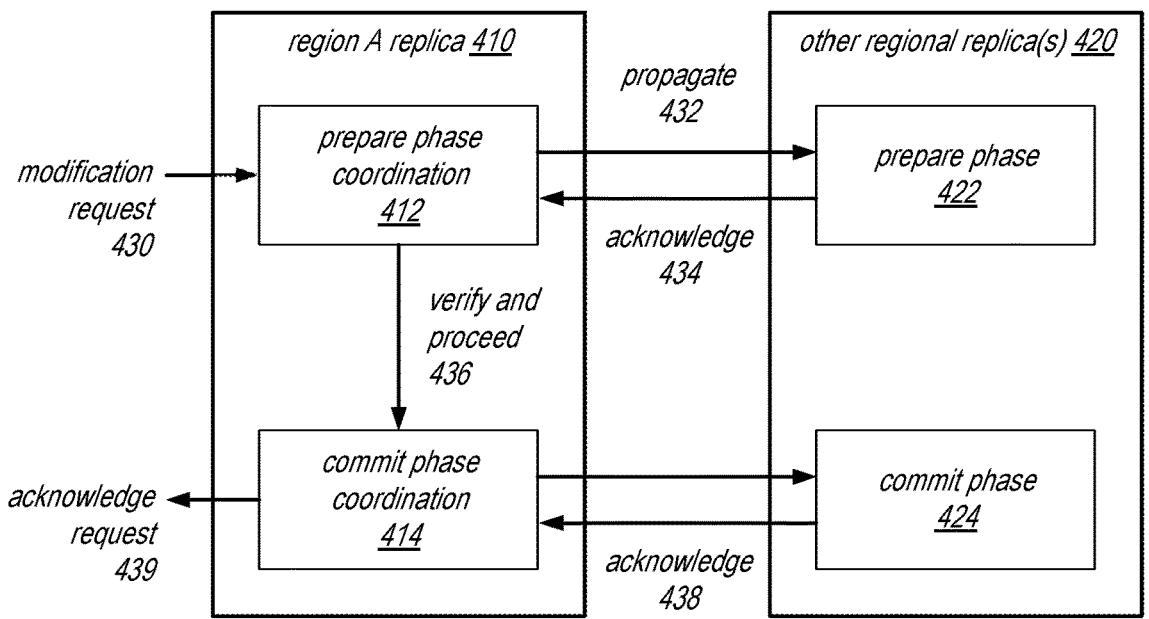
FIGS. 4A and 4B illustrate different techniques of propagating metadata property changes across multiple regions of a global object, according to some embodiments.
Figure 4B:
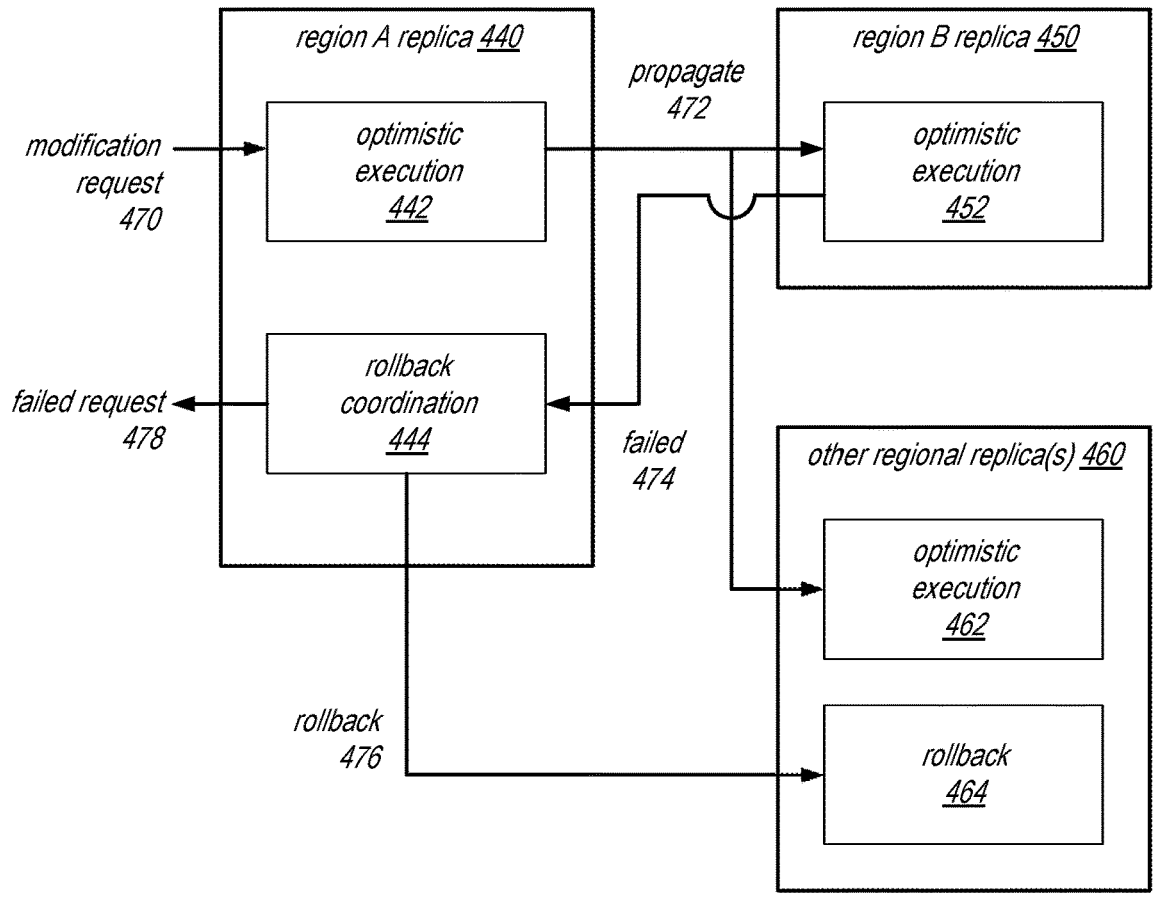

FIGS. 4A and 4B illustrate different techniques of propagating metadata property changes across multiple regions of a global object, according to some embodiments.

FIG. 4A depicts a two-phase commit process that can be used to implement the propagation of metadata property changes from one regional replica 410 in region A to other regional replicas 420 of the same global object. While the figure depicts various functional components or operations in the replicas for explanatory purposes, in some embodiments, these functional components or operations may be implemented by the database instances that are managing the replica objects.

In the depicted process of FIG. 4A, a modification request 430 is received to modify a property of region A replica 410, which causes the change to be propagated to the other replicas 420. In some embodiments, the database instances at the other regions cannot guarantee ahead of time that a particular property change can be successfully performed. For example, a property change that can be performed at one region may fail at another region, due to factors such as region-specific security rules, current operating conditions of the database instance, or other region-specific constraints. Accordingly, to ensure that the requested management operations is performed in an all-or-nothing fashion across all regions, a two-phase commit process is employed in some embodiments.

As shown, a prepare phase coordination module or operation 412 is employed to first propagate 432 a number of prepare instructions or messages to the other regional replicas 420. The other regional replicas 420 performs a prepare phase 422 of the two-phase process to verify that the requested management operation can be successfully performed at their respective locations. If the preparation phase 422 is successful, these regional replicas 420 return respective acknowledgments 434 back to the coordination module 412, which verifies the acknowledgments and proceeds 436 to the commit phase of the process. Importantly, if any of the other regional replicas 420 cannot successfully complete the prepare phase 422 or fails to return an acknowledgment 434 within an expected time, the two-phase process may be deemed to fail an abort. In some embodiments, an additional abort message may be propagated to the other regional replicas. In this manner, if any one regional replica cannot successfully carry out a metadata property change, no replica of the global object will implement the change.

If all regional replicas 420 acknowledge successful completion of the prepare phase 422, in some embodiments, a commit phase coordination operation or module 414 will be performed. In some embodiments, during the commit phase, one or more instructions or messages may be sent to the other regional replicas 420 to a commit phase 424 on each of the regional replicas 420. During the commit phase 424, the modification request 430 may be actually performed to take effect on the replica objects. Importantly, there should be little or no risk of failure of the modification request, because of the verification performed during the prepare phase 422. Once the commit phase 424 is completely at the individual regional replicas 420, the regional replicas may send another acknowledgment 438 back to the coordinating replica 410. In some embodiments, receipt of acknowledgements 438 from all expected remote replica object may allow the coordinating replica 410 to return an acknowledgment 439 to the request.

FIG. 4B depicts an optimistic modification process, which may be an alternative process used in some embodiments to implement the propagation of metadata property changes from one regional replica 440 in region A to other regional replicas 450 and 460. While the figure depicts various functional components or operations in the replicas for explanatory purposes, in some embodiments, these functional components or operations may be implemented by the database instances that are managing the replica objects.

In the depicted process of FIG. 4B, a modification request 470 is received to modify a property of region A replica 440, which causes the change to be propagated 472 to the other replicas 450 and 460. In this example process, the requested modification is performed optimistically at the originating regional replica 440 and each of the other replicas, for example, using an optimistic execution module or operation 442, or other optimistic execution modules or operations 452 and 462. In some embodiments, the optimistic execution modules 442, 452, and 462 may cause the requested property modification to be performed and take effect without verifying that the modification can be successfully performed everywhere. If the requested modification is successful on all regional replicas (not shown), the modification process is complete, and the replica 440 at region A may return an acknowledgement.

However, if any of the regional replicas (e.g. replica 450 in region B) cannot successfully perform the property modification (e.g. due to some region-specific constraints), a message or response indicating a failure 474 is returned to the replica 440 originating the modification request. In that event, in some embodiments, the originating replica 440 may initiate a rollback process, for example, using a rollback coordination module or operation 444. In some embodiments, the rollback coordination module 444 may send instructions or modules to all or some of the other regional replicas 460 (or 450) of the global object, to cause the other replicas to rollback the property modification that they performed, for example, via a rollback module or operation 464. In some embodiments, if a failure 474 of the requested property modification is encountered at any one replica object of the global object, the originating replica 440 may issue a failed request response 478 back to the requesting client. In some embodiments, the response 478 may indicate the reason for the failure, including for example the regional replica 450 that experienced the failure.

Figure 5:
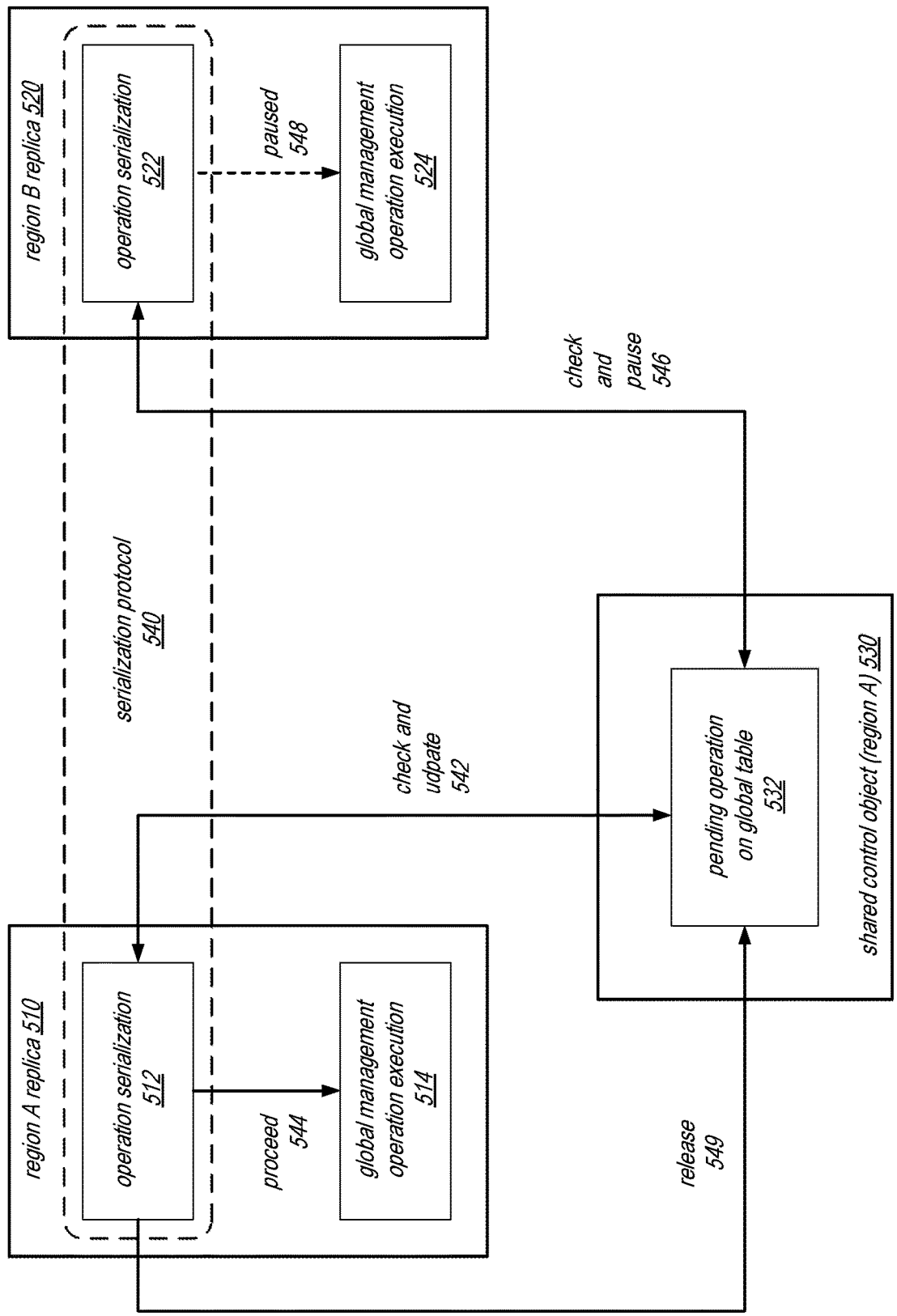
FIG. 5 illustrates an example serialization protocol for serializing global management operations on a global object, according to some embodiments.

FIG. 5 illustrates an example serialization protocol for serializing global management operations on a global object, according to some embodiments. While the figure depicts various functional components or operations in the replicas for explanatory purposes, in some embodiments, these functional components or operations may be implemented by the database instances that are managing the replica objects.

As shown, in this example, a replica 510 at region A and another replica 520 at region B implement a serialization protocol to serialize global management operation to be performed on a global object. In some embodiments, the replicas 510 and 520 may be implemented in a similar fashion as replicas 252 and 254 of FIG. 2, to implement a global object (e.g. a global table 250). In some embodiments, management operations that modify metadata properties of a global object may original from any region where it has a replica object. In some embodiments, management operations from different regions may occur close to the same time, which may could create a situation where the management operations will propagate to the different replicas in the group in a different order. In some embodiments, this difference in the ordering of management operations may cause a correctness issue within the global object. For example, in one scenario, two conflicting management operations (e.g. to toggle a mode setting on the replica objects) must appear in the same order to all the replica objects. According, in some embodiments, the database system (e.g. via the database management operation interface 132) may enforce a serialization of all management operations on a global object, using a serialization protocol 540.

In this example, as shown, the serialization protocol 540 is implemented by respective operation serializations functions or components 512 and 522 at the two regional replicas. In some embodiments, all regional replicas that can issue metadata properties changes on the global object will implement the same serialization protocol 540. In this example, the serialization protocol involves a check operation (e.g. checks 542 and 546) on a shared control object 530. In some embodiments, there is only one instance of the shared control object 530 at any given time, and all the database instances in the different regions of the global object are configured to access the control object before proceeding with any management operation on the global object.

In some embodiments, the shared control object 530 may simply be a flag, which is set to indicate that a management operation is current pending or in progress on the global object. As may be understood, such an operation may take some time to complete, because it involves coordination over multiple locations. In some embodiments, as long as the "in progress" flag is set, no other management operation can begin on the global object.

In some embodiments, the control object may be a more complex data structure, such as a semaphore, a lock, a global queue, or the like. In some embodiments, for example, incoming management operations may be added to a global queue in a first in first out (FIFO) order, so as to impose an ordering on the management operations. In some embodiments, the shared control object 530 may be stored at one region of the global object, which may also store certain "master" metadata about the global object. In some embodiments, the location of the control object 530 may be at any location of the global object, or periodically rotate over time.

In this example, the replica object 510 is the first to originate a management operation on the global object. In response, the serialization component 512 performs on a check 542 on the control object 530, and determines whether there are any currently pending management operations 532 on the global object. If not, the serialization module 512 updates the control object 530 to indicate that there is now a pending management operation. The serialization module 512 then allows the management operation to proceed 544, for example by invoking the global management operation module 514, which may cause the operation to be propagated to all other replica objects of the global object. In some embodiments, as shown, after the global management operation is complete (either successfully or unsuccessfully), the operation serialization module 512 may release 549 the shared control object 530 or update the control object 530 to indicate that there are now no pending management operations 532 on the global object.

As shown, in this example, when the first management operation is pending, a second management operation is originated from the replica object 522 of region B. As with the first management operation, the second management operation may first invoke the operation serialization module 522 of region B, to check 546 whether there are any pending management operations indicated by the control object 530. In this case, there is, because the first management operations originated by the replica of region A is in progress. Accordingly, based on the serialization protocol 540, the module 522 will cause own its management operation to be paused 548 by issuing an instruction to its own global management operation module 524. In some embodiments, the serialization module 522 may simply reject the management operation, and generate a message to the database client to retry the management operation later. Accordingly, there will not be two management operations that are simultaneously being propagated through global object. In some embodiments, the replica object of region B may register to wait for a release of the control object, so that it can immediately proceed with its management operation when the control object is released. In some embodiments, the serialization module 522 may periodically check back with the control object, for example at random times, until it discovers that the no management jobs are pending. At that point, the replica object of region B can proceed with its global management operation, which may be propagated across all regions of the global object. As may be understood, when the database instance at all regions of a global object implement this serialization protocol 540, a definite ordering of all management operations on the global object can be achieved.

Figure 6:
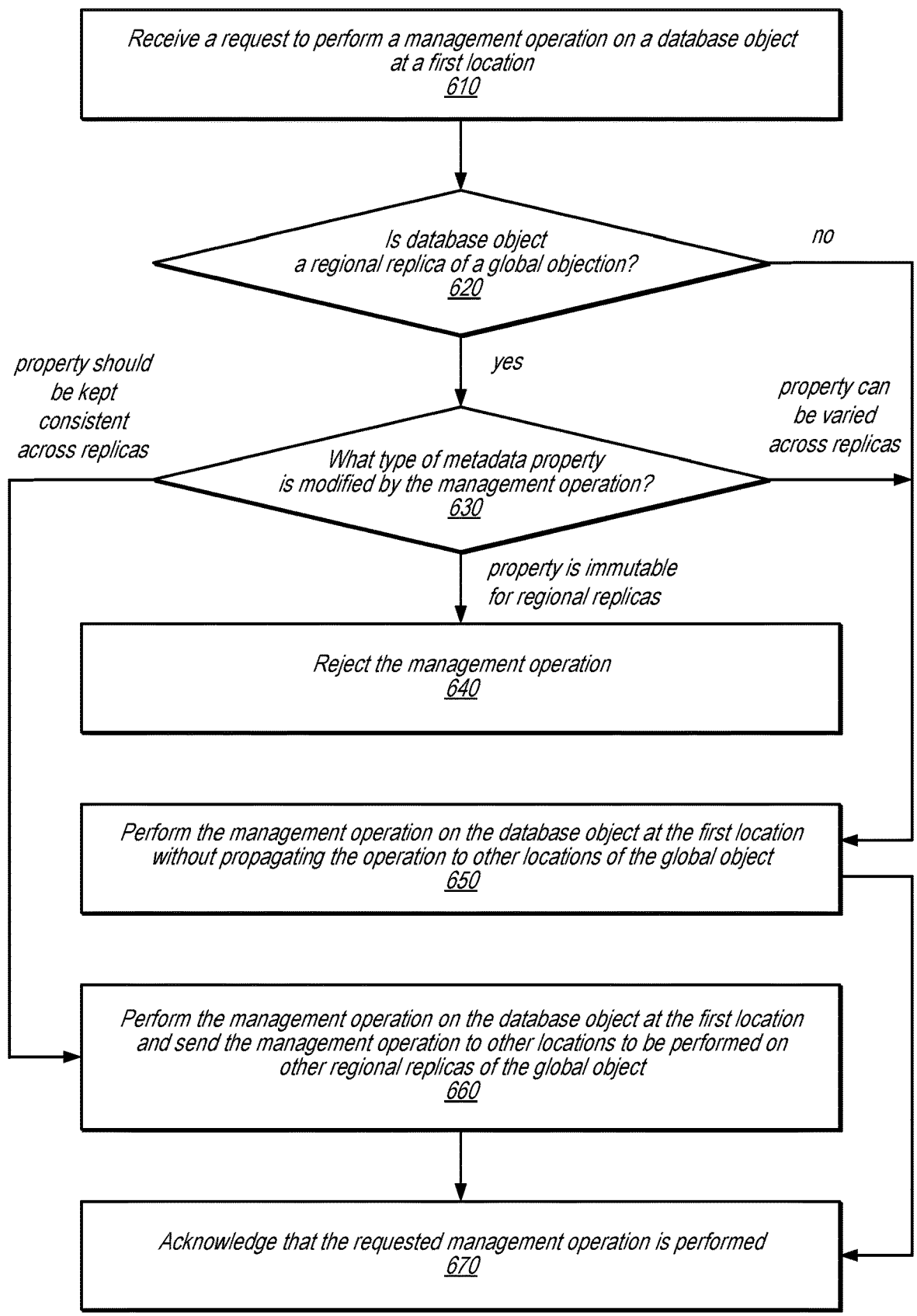
FIG. 6 is a flowchart illustrating a process of performing object management operations on a database object that is a regional replica of a global object, according to some embodiments.

FIG. 6 is a flowchart illustrating a process of performing object management operations on a database object that is a regional replica of a global object, according to some embodiments. In some embodiments, the depicted process may be performed by one or more components of the database system (e.g. database instance 130 at location A) of FIG. 1.

The process begins at operation 610, where a request is received to perform a management operation on a database object at a first location. In some embodiments, the management operation may be the operation 122 of FIG. 1, which may be received via the database object management interface 132 of FIG. 1. In some embodiments, the requested management operation may seek to modify or change a metadata property of a database object in the database system. For example, the database object may be a database table, an index, etc. In some embodiments, the management operation may be used on a regional object (e.g. one that is not part of a global object), or a regional replica object that is part of a global object.

At operation 620, a determination is made whether the database object is a regional replica object of a global object. As discussed, in some embodiments, certain management operations may be overloaded to work on both regional and global objects. In some embodiments, a component or module in the management operation handling routine (e.g. the global object detection module 140 of FIG. 1) may be used to determine whether the target object of the operation is a regional object or a replica of a global object. If the target object is not a replica object in a global object (e.g. it is just a regional object), the process proceeds to operation 650, where the operation is handled regionally. If the target object is a replica object, the process proceeds to operation 630.

At operation 630, another determination is made to ascertain the type of metadata property that is being modified by the management operation. As discussed, certain types of management operations may modify metadata property objects of database objects, which may be grouped into categories or types such as types 320, 330, and 340 shown in FIG. 3. Depending on the determined type of the metadata property, the process may proceed to operations 640, 650, or 660, as shown.

At operation 640, if the metadata property being changed by the operation is a property that is immutable for replica objects (e.g. property of type 320 in FIG. 3), the management operation is rejected. In some embodiments, such a metadata property may be, for example, a setting to enable or disable an update stream of the database object, which may need to be always enabled for a replica object. In some embodiments, the rejection of the operation may be accompanied by an error message to the client, indicating the reason for the rejection (e.g. the metadata property being changed is immutable for a replica object).

At operation 650, if the metadata property being change by the operation is a type of property that can be varied across regional replicas of a global object (e.g. property type 330 of FIG. 3), the management operation is performed at the database at the first location, without propagating the operation to other locations of the global object. That is, the management operation is performed only regionally, allowing the metadata property to be different across the regions. In some embodiments, this operation may be performed by the regional operation handling module 134, as discussed in connection with FIG. 1.

At operation 660, if the metadata property being change by the operation is a type of property that should be kept consistent across regional replicas of a global object (e.g. property type 340 of FIG. 3), the management operation is performed not only on the database object at the first location, but also propagated to other locations of the global object to be performed on other replica objects. In some embodiments, this propagation may be used to keep this metadata property the same across all regions. In some embodiments, this operation may be performed by the global operation coordination module 150 of FIG. 1, or according to the process depicted in FIG. 4A or 4B.

At operation 670, after either operation 650 or 660, the database system acknowledges that the requested management operation is performed. In some embodiments, if the operation was broadcast to other regions of the global object, the database system may wait until the operation is completed at all regions before acknowledging the management operation request. In some embodiments, the acknowledgement may be provided as a response to the request, in accordance with the specifications of the database object management interface 132.

Figure 7A:
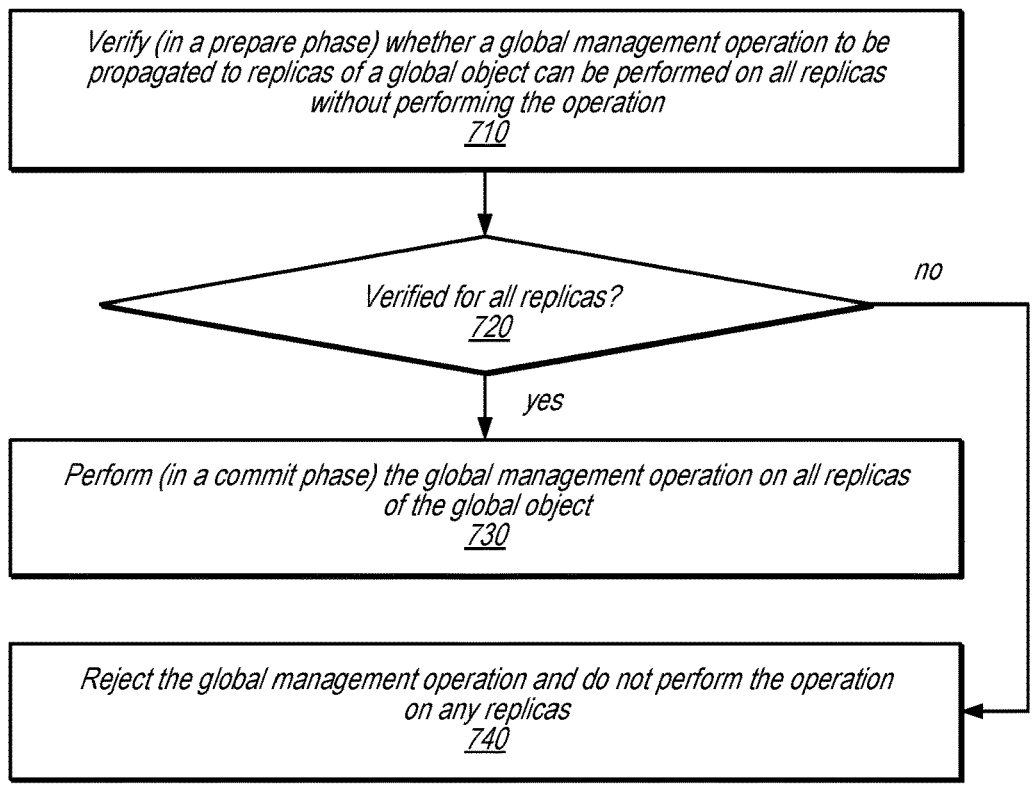
FIGS. 7A and 7B are flowcharts illustrating two processes for propagating object management operations to different regions of a global object, according to some embodiments.
Figure 7B:
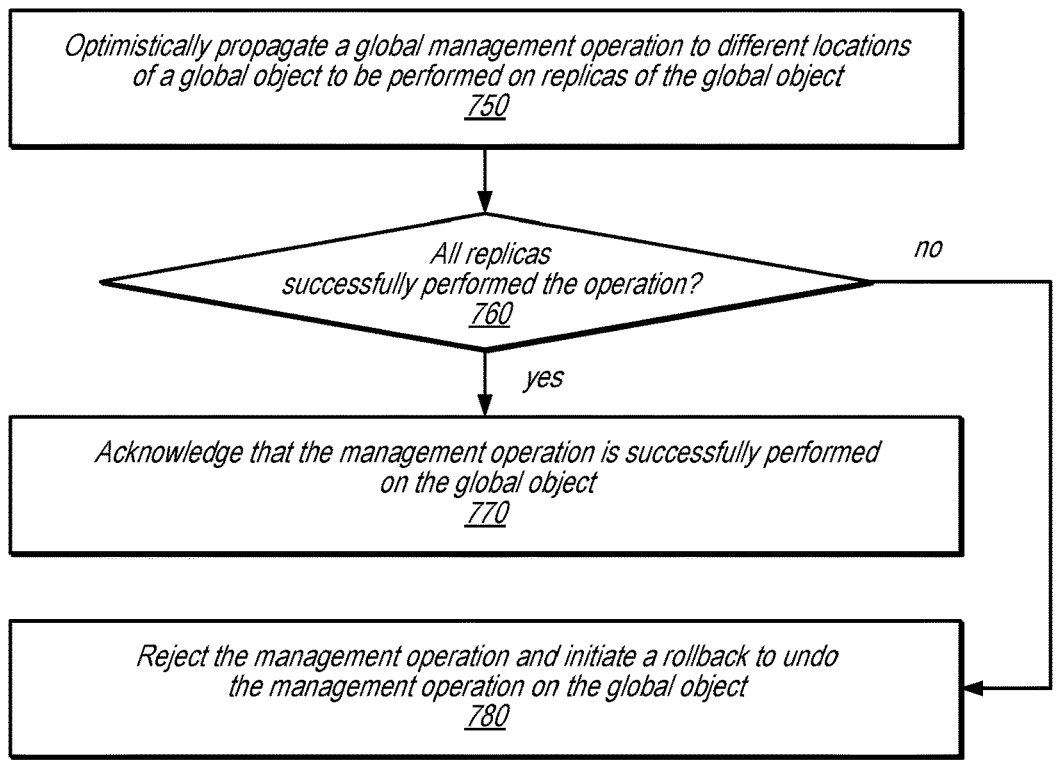

FIGS. 7A and 7B are flowcharts illustrating two processes for propagating object management operations to different regions of a global object, according to some embodiments. In some embodiments, the processes depicted may be performed by different database instances of a database system, as discussed in connection with FIGS. 1, 4A, and 4B.

FIG. 7A depicts a process of propagating a global management operation on a global object using a two-phase commit protocol. At operation 710, the process begins by verifying, in a prepare phase, whether a global management operation to be propagated to replicas of a global object can be performed on all replicas, but without actually performing the operation. In some embodiments, the prepare phase may include sending instructions or messages to all regions of the global object to check whether the global management operations can be successfully performed everywhere. In some embodiments, other database instance at the different regions may perform the verification by executing a prepare phase operation (e.g. operation 422 of FIG. 4A), and report back to a coordinating region whether the prepare phase was successful.

At operation 720, a determination is made whether the management operation is verified (e.g. can be successfully performed) at all replicas at the different regions of the global object. In some embodiments, the verification may be performed by the database instance that originated the management operation, for example using the prepare phase coordination module 412 of FIG. 4A. In some embodiments, the prepare phase coordination module 412 may make the determination based on acknowledgments received from the database instances at the other regions.

At operation 730, if the global management operation is verified for all replicas, a commit phase is performed, where the global management operation is actually performed on all replicas of the global object. In some embodiments, this operation may include sending another round of instructions or messages from the coordination database instance to the other database instances at the other regions, causing the other database instances to perform the management operation. In some embodiments, the management operation is also performed locally at the originating region. In some embodiments, this operation may be coordinated at the originating region by a commit phase coordinator module or operation 414, and performed at the other regions by a commit phase operation or module 424, as shown in FIG. 4A. In some embodiments, the database instances at the other regions may provide a further acknowledgement of the commit phase. When all of these second acknowledgements are received, the coordinating database instance may acknowledge that the management operation is successfully performed to the requesting client.

At operation 740, if the global management operation is not verified for all replicas, the global management operation is rejected. Thus, the global operation is not performed in any regions of the global object, including the originating region. In some embodiments, the rejection may include a response message, which may indicate the reason for the rejection, for example, identifying one or more regions where the management operation cannot be verified during the preparation phase or cannot be successfully performed.

FIG. 7B depicts a process of propagating a global management operation on a global object using an optimistic update protocol. At operation 750, the process begins by optimistically propagating a global management operation to different locations of a global object to be performed on the replica objects of the global object at those locations. Thus, unlike the process in FIG. 7A, there is no verification before the management operation is attempted at the different locations. In some embodiments, this operation may be executed and propagated by the optimistic execution module 442 of FIG. 4B, and executed at the other regions of the global object by the optimistic execution modules 452 and 462 of FIG. 4B.

At operation 760, a determination is made whether all replica objects of the global object successfully performed the management operation. In some embodiments, this determination may be made by the database instance at the coordinating region, and based on responses or acknowledgements received from the database instances at the other regions. In some embodiments, a positive acknowledgment is used to indicate that the operation is successful at another region. In some embodiments, an error message or lack of response within a certain time window may indicate that the operation was not successful at another region. In some embodiments, even before any acknowledgements are received from the other regions, the management operation may be performed locally at the originating region, causing a metadata property change to take effect at the originating region.

At operation 770, if the global management operation is successfully performed at all replicas, an acknowledgment is provided to the requesting client that the management operation is successfully performed on the global object. In some embodiments, this acknowledgement may be performed in an asynchronous manner with the request for the management operation. For example, the request for the management operation may return immediately without any acknowledgment, and the acknowledgement of the management operation may be provided at a later time.

At operation 780, if the global management operation is not successfully performed at all replicas, the management operation is rejected. Additionally, a rollback process is initiated to undo the management operation on the global object. In some embodiments, this operation may be performed via the rollback coordination operation or module 444 and the rollback operation or module 464, as discussed in connection with FIG. 4B. In some embodiments, the rollback process may cause the rollback operation to be performed on all replica objects of the global object that have successfully performed the management operation. In some embodiments, the client may be notified of the failed request at the end of the rollback process. In some embodiments, the client may be notified before the completion of the rollback process. In some embodiments, the notification to the client may indicate the reason for the failure of the management operation, for example, to identify a region where the operation cannot be successfully performed.

Figure 8:
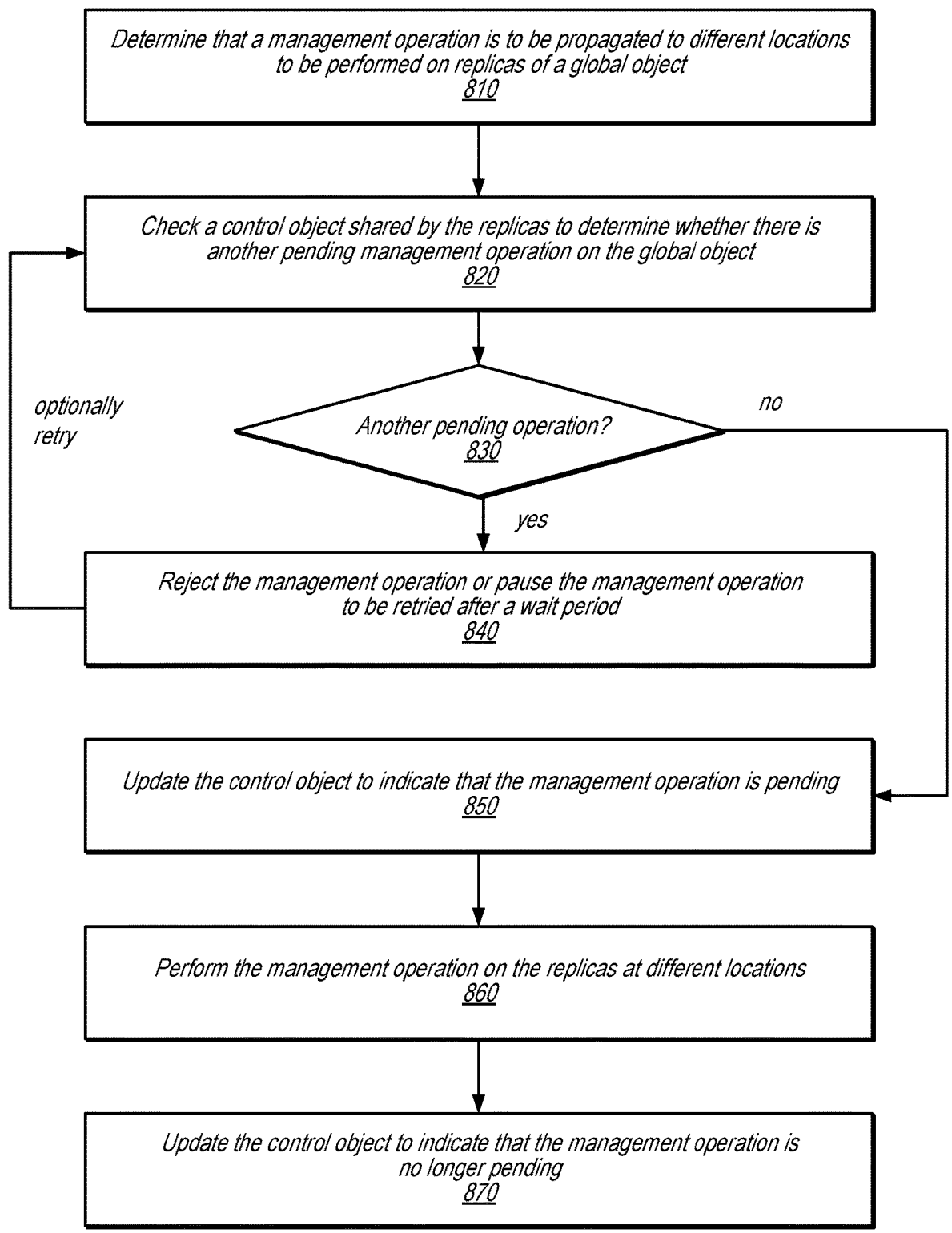
FIG. 8 is a flowchart illustrating a process of serializing global management operations on a global object, according to some embodiments.

FIG. 8 is a flowchart illustrating a process of serializing global management operations on a global object, according to some embodiments. In some embodiments, the processes depicted may be performed by different database instances of a database system, as discussed in connection with FIGS. 1 and 5.

At operation 810, a determination is made that a management operation on a global object is to be propagated to different locations of the global object, to be performed on different replica objects at the different locations. In some embodiments, the global object may be global object 170 of FIG. 1. In some embodiments, the propagation may be performed by the global operation coordination module 150 of FIG. 1, and using a protocol as described in FIG. 4A or 4B.

At operation 820, a check is performed on a control object that is shared by the replicas, to determine whether there is another currently pending management operation on the global object. In some embodiments, the control object may be the shared control object 530 of FIG. 5. Depending on the embodiment, the shared control object may be implemented as a flag, a lock, a table, a queue, or the like. In some embodiments, the shared control object may be maintained at one location of the global object but accessible by database instances from other locations. As may be understood, certain global management operations may take some time to complete, and the control object may indicate that some other global management operation is currently in progress. This indication allows other global management operations to be paused or rejected, so as to prevent overlap between the propagation of two management operations. If there is another pending management operation determined at operation 830, the process proceeds to operation 840. If not, the process proceeds to operation 850.

At operation 840, the incoming or new management operation is rejected or paused, based on the determination that another management operation is pending. In some embodiments, after a pause, the database instance, using for example the operation serialization module 522 of FIG. 5, may periodically re-check 820 the control object (e.g. control object 530) to determine whether the other management operation is still pending. In some embodiments, the checking may continue for some specified time, or a specified number of retry attempts, before abandoning the management operation. In some embodiments, the retry attempts may be made after a random amount of time.

At operation 850, if there are no pending management operations according to the control object, the control object is updated to indicate that the new management operation is now pending. In some embodiments, this indication will cause all subsequent management operations to be rejected or blocked, in accordance with the serialization protocol. In some embodiments, the update of the control object may be performed as a single atomic operation, so that it cannot be simultaneously performed by two different actors. Depending on the embodiment, the update operation may include toggling a flag, acquiring a lock, writing a table entry, or adding the management operation to a queue.

At operation 860, the management operation is actually performed. As discussed, in some embodiments, the performance of the operation may involve propagating the operation to multiple remote regions to be performed on replica objects in those regions. In some embodiments, the propagation may be performed in a manner described in connection with FIG. 4A or 4B. In some embodiments, the performance of the management operation is completed based on either a success or failure of the operation on the global object. In some embodiments, after the management operation is completed, there will be no further attempts to update the metadata properties of any replica objects of the global object.

At operation 870, the control object is again updated to indicate that the management operation is no longer pending. In some embodiments, this second update may permit subsequent management operations to proceed, according to the serialization protocol. In some embodiments, the update may trigger a wakeup notification to be sent to other waiting database instances with paused management operations, so that they can engage in a process to determine the next management operation to proceed. Depending on the embodiment, the update of the control object may include toggling a flag, releasing a lock, deleting or updating a table entry, or dequeuing the management operation from a queue.

Figure 9:
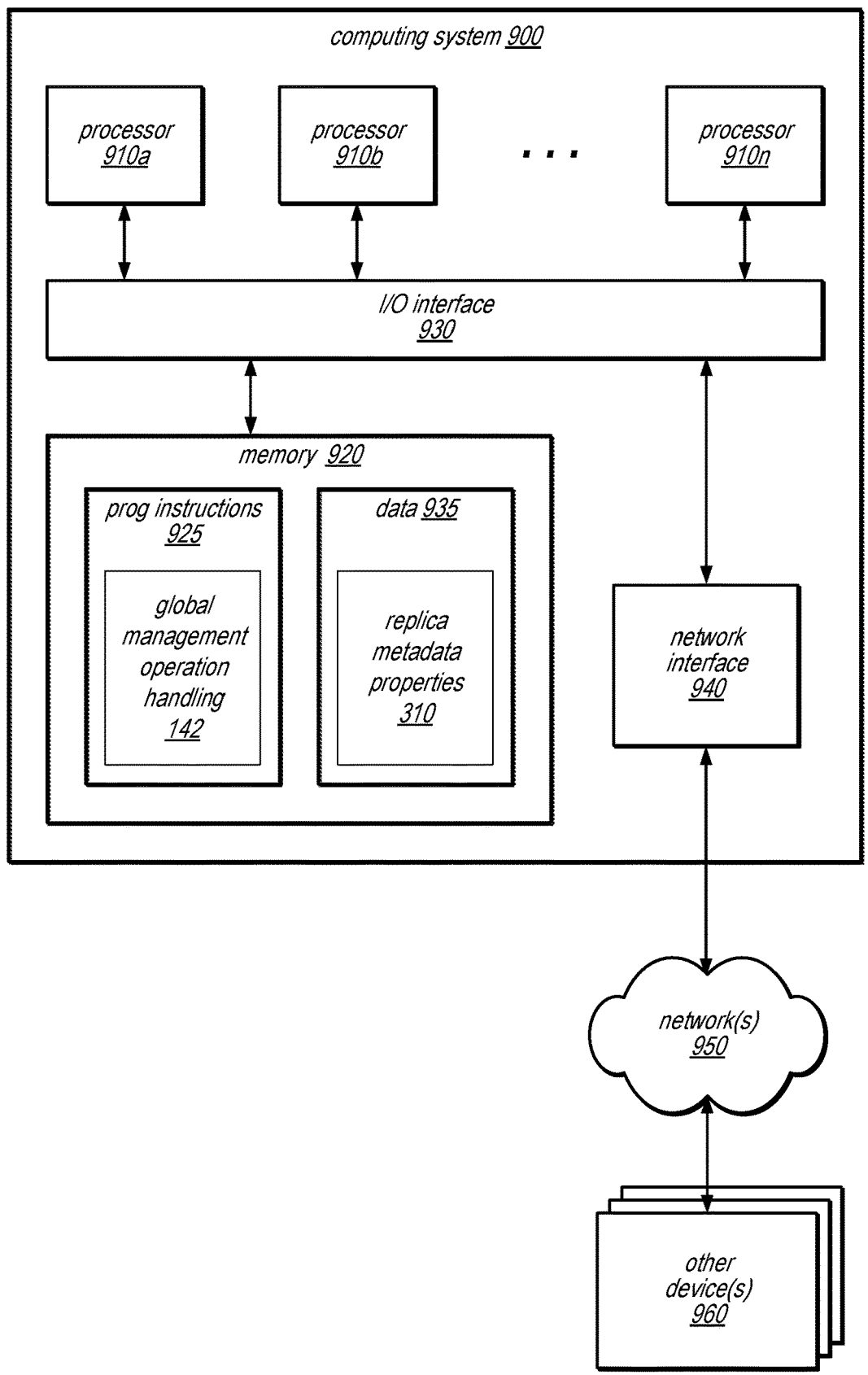
FIG. 9 is a block diagram illustrating an example computer system that can be used to implement one or more portions of a database system that implements global object management operations to consistently manage the metadata properties of regional replica objects of a global object, according to some embodiments.

FIG. 9 is a block diagram illustrating an example computer system that can be used to implement one or more portions of a database system that implements global object management operations to consistently manage the metadata properties of regional replica objects of a global object, according to some embodiments. Computer system 900 may include or be configured to access one or more nonvolatile computer-accessible media. In the illustrated embodiment, computer system 900 includes one or more processors 910 coupled to a system memory 920 via an input/output (I/O) interface 930. Computer system 900 further includes a network interface 940 coupled to I/O interface 930.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code 925 and data 935. In some embodiments, the code 925 may include code or instructions to implement different modules of the database system, such as the global management operation handling module 142 of FIG. 1. In some embodiments, the data 935 may include data that is maintained by the database system, such as the replica object metadata properties 310 of FIG. 3.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices, such as routers and other computing devices, as illustrated in FIGS. 1 through 8f, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A system, comprising:
one or more hardware processors with associated memory that implement a database system, configured to:
  receive, from a client device, a request to perform a management operation on a database object at a first location;
  determine that the database object is one replica in a group of replicas maintained as part of a global object, wherein individual ones of the replicas are located at different locations, and changes in one replica of the global object are transmitted to one or more other ones of the different locations and replicated across all replicas of the global object;
  determine that the management operation specifies a modification to a metadata property of the database object that is to be kept consistent across all replicas of the global object;
  send the management operation from the first location to one or more other ones of the different locations to perform the management operation on one or more other replicas of the global object;
  perform the management operation on the database object at the first location; and
  acknowledge that the management operation has been performed on the global object.

2. The system of claim 1, wherein:
the database object is a table that projects at least a portion of its data to an index object used to query the portion of data; and
the management operation modifies an attribute data type of the index object.

3. The system of claim 1, wherein:
the database object or an index object associated with the database object is associated with a write throughput limit for an amount of write operations over a time period; and
the management operation modifies the write throughput limit.

4. The system of claim 3, wherein the database system is configured to:
verify, prior to said performing the management operation on one or more other replicas, that the write throughput limit can be successfully modified for all replicas of the global object; and
wherein the verification is a precondition to perform the management operation on the one or more other replicas.

5. The system of claim 1, wherein database system is configured to enforce a serialization of management operations on the global object, to:
prior to said performing the management operation on the database object or the one or more other replicas:
  check a control object to determine that there no other management operations pending for the global object; and
  update the control object to indicate that the management operation is pending; and
subsequent to said performing the management operation on the database object and the one or more other replicas:
  update the control object to indicate that the management operation is no longer pending.

6. A method comprising:
performing, by one or more hardware processors with associated memory implementing a database system:
  receiving, from a client device, a request to perform a management operation on a database object at a first location;

determining that the database object is one replica in a group of replicas maintained as part of a global object, wherein individual ones of the replicas are located at different locations;

determining that the management operation specifies a modification to a metadata property of the database object that is to be kept consistent across all replicas of the global object;

sending the management operation from the first location to one or more other ones of the different locations to perform the management operation on one or more other replicas of the global object;

performing the management operation on the database object at the first location; and acknowledging that the management operation has been performed on the global object.

7. The method of claim 6, wherein:

the database object is a table that projects at least a portion of its data into an index object used to query the portion of data; and the management operation modifies an attribute data type of the index object.

8. The method of claim 6, wherein:

the database object or an index object associated with the database object is associated with a write throughput limit for an amount write operations over a time period; and the management operation modifies the write throughput limit.

9. The method of claim 6, wherein:

the database object is associated with a time-to-live property that specifies how long data items are to be kept in the database object before it is deleted; and the management operation modifies the time-to-live property.

10. The method of claim 6, further comprising performing, by the database system:

receiving another request to perform another management operation on the database object;

determining that the other management operation does not specify a modification to a metadata property of the database object that is to be kept consistent across all replicas of the global object;

performing the other management operation on the database object; and acknowledging that the other management operation has been performed on the global object without sending the other management operation to one or more other ones of the different locations.

11. The method of claim 10, wherein the other management operation includes one or more of:

a modification of a read throughput limit for an amount of read operations directed to the database object over a period of time;

a modification of a client-managed encryption key used to encrypt data in the data object;

a detachment of the database object from the global object; and a deletion of the database object but not the one or more other replicas of the global object.

12. The method of claim 6, further comprising performing, by the database system:

receiving another request to perform another management operation on the database object, wherein the other request specifies to stop an update stream generated from the database object, and the update stream is used to transmit changes in database object to the one or more other replicas of the global object; and rejecting the other management operation and providing a message indicating that the update stream cannot be stopped for the global object.

13. The method of claim 6, further comprising performing, by the database system:

verifying, in a preparation phase and prior to said performing the management operation on one or more other replicas, that the metadata property can be successfully modified for all replicas of the global object; and wherein the verification is a precondition to performing the management operation on the one or more other replicas.

14. The method of claim 6, further comprising performing, by the database system:

receiving a message that the management operation is not successfully performed on at least one replica of the global object; and responsive to the message, initiating a rollback operation to undo the management operation on the global object.

15. The method of claim 6, further comprising performing, by the database system:

prior to said performing the management operation on the database object or the one or more other replicas:

checking a control object to determine that there no other management operations pending for the global object, wherein detection of any pending management operations on the global object causes the management operations to be rejected or paused; and updating the control object to indicate that the management operation is pending; and subsequent to said performing the management operation on the database object and the one or more other replicas:

updating the control object to indicate that the management operation is no longer pending.

16. The method of claim 6, wherein the management operation is an overloaded operation that is propagated to the other locations when it is directed to a replica of a global object, but not propagated to the other locations when it is directed to a regional object that is not a part of a global object.

17. One or more non-transitory computer-accessible storage media storing program instructions that when executed on or across one or more processors of a database system, cause the database system to:

receive, from a client device, a request to perform a management operation on a database object at a first location;

determine that the database object is one replica in a group of replicas maintained as part of a global object, wherein individual ones of the replicas are located at different locations;

determine that the management operation specifies a modification to a metadata property of the database object that is to be kept consistent across all replicas of the global object;

send the management operation from the first location to one or more other ones of the different locations to perform the management operation on one or more other replicas of the global object;

perform the management operation on the database object at the first location; and acknowledge that the management operation has been performed on the global object.

18. The one or more non-transitory computer-accessible storage media of claim 17, wherein:
- the database object or an index object associated with the database object is associated with a write throughput limit for an amount write operations over a time period; and
- to determine that the management operation specifies a modification to a metadata property of the database object that is to be kept consistent across all replicas of the global object, the program instructions when executed on or across the one or more processors cause the database system to determine that the management operation specifies a modification of the write throughput limit.

19. The one or more non-transitory computer-accessible storage media of claim 17, wherein the program instructions when executed on or across the one or more processors cause the database system to:
- determine that the management operation is not successfully performed on at least one replica of the global object; and
- responsive to the determination that the management operation is not successfully performed, initiate a rollback operation to undo the management operation on the global object.

20. The one or more non-transitory computer-accessible storage media of claim 17, wherein:
- the database object is associated with a time-to-live property that specifies how long data items are to be kept in the database object before it is deleted; and
- to determine that the management operation specifies a modification to a metadata property of the database object that is to be kept consistent across all replicas of the global object, the program instructions when executed on or across the one or more processors cause the database system to determine that the management operation specifies a modification of the time-to-live property.

* * * * *